United States Patent
Matsumoto

(10) Patent No.: US 12,480,911 B2
(45) Date of Patent: Nov. 25, 2025

(54) VIBRATING SAMPLE MAGNETOMETER AND MEASUREMENT METHOD OF MAGNETIC PROPERTY

(71) Applicant: Mitsubishi Electric Corporation, Tokyo (JP)

(72) Inventor: Norihisa Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 194 days.

(21) Appl. No.: 18/276,098

(22) PCT Filed: Feb. 24, 2021

(86) PCT No.: PCT/JP2021/006889
§ 371 (c)(1),
(2) Date: Aug. 7, 2023

(87) PCT Pub. No.: WO2022/180695
PCT Pub. Date: Sep. 1, 2022

(65) Prior Publication Data
US 2024/0094163 A1 Mar. 21, 2024

(51) Int. Cl.
*G01N 1/28* (2006.01)
*G01N 27/72* (2006.01)

(52) U.S. Cl.
CPC ............. *G01N 27/725* (2013.01); *G01N 1/28* (2013.01)

(58) Field of Classification Search
CPC ................ G01R 33/00; G01R 33/0035; G01R 33/0023; G01R 33/0017; G01R 31/3191;
(Continued)

(56) References Cited

U.S. PATENT DOCUMENTS 10,345,398 B1 * 7/2019 Zhou ................... G01R 33/0064
2007/0102069 A1 * 5/2007 Hidaka ................. H01F 41/026
148/302

FOREIGN PATENT DOCUMENTS

JP H08201494 A * 8/1996 ............. G01N 27/72
JP 2018084463 A * 5/2018 ............. G01R 33/06

OTHER PUBLICATIONS

Extended European Search Report received for European Patent Application No. 21927798.5, mailed on Mar. 26, 2024, 13 pages.
(Continued)

*Primary Examiner* — Lee E Rodak
*Assistant Examiner* — Taqi R Nasir
(74) *Attorney, Agent, or Firm* — XSENSUS LLP

(57) ABSTRACT

A magnetic property acquisition unit detects an induced voltage caused by vibration of a measurement sample magnetized by an excitation electromagnet and acquires a magnetic property that indicates a relationship between a magnetic flux density and an external magnetic field. The magnetic flux density is a sum of magnetization of the measurement sample and the external magnetic field. When acquiring the magnetic property of the measurement sample to which pressure is being applied, a control device sets a first magnetic field value as a sweep start value, and performs sweeping with a magnetic field equal to or less than the first magnetic field value. The first magnetic field value is smaller than a second magnetic field value that is acquired before the pressure is applied to the measurement sample, and corresponds to a saturation magnetic flux density of the measurement sample to which the pressure is not being applied.

15 Claims, 7 Drawing Sheets

(58) Field of Classification Search
CPC ........ G01N 27/725; G01N 1/28; G01B 7/004; G01C 17/38; G06F 3/017; G06F 3/0346; G06F 3/012
See application file for complete search history.

(56) References Cited

OTHER PUBLICATIONS

International Search Report and Written Opinion mailed on May 18, 2021, received for PCT Application PCT/JP2021/006889, filed on Feb. 24, 2021, 10 pages including English Translation.

* cited by examiner

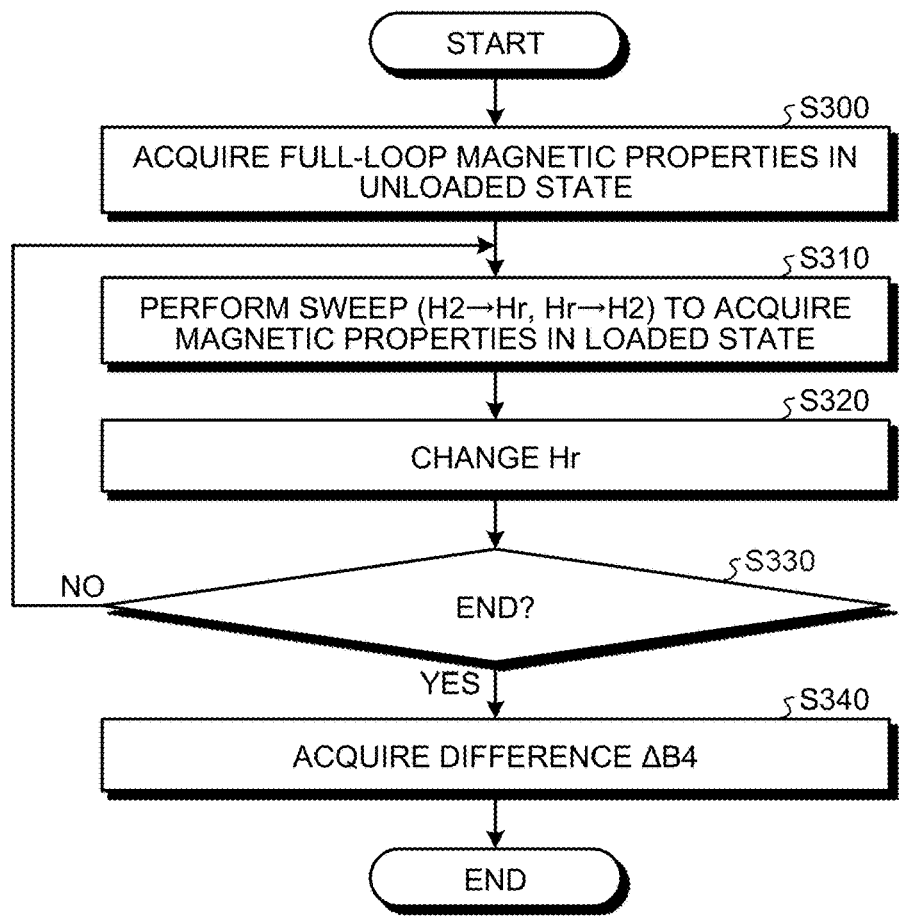
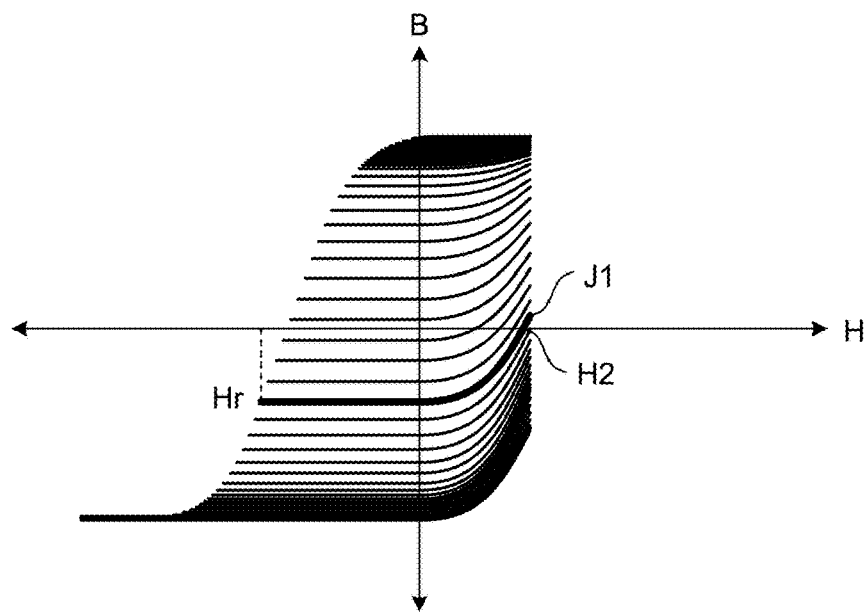

ND MEASUREMENT METHOD OF
VIBRATING SAMPLE MAGNETOMETER AND MEASUREMENT METHOD OF MAGNETIC PROPERTY

CROSS-REFERENCE TO RELATED APPLICATIONS

The present application is based on PCT filing PCT/JP2021/006889, filed Feb. 24, 2021, the entire contents of which are incorporated herein by reference.

FIELD

The present disclosure relates to a vibrating sample magnetometer.

BACKGROUND

A vibrating sample magnetometer vibrates a magnetic sample placed in a magnetic field at a constant frequency and a constant amplitude, and measures electromotive force induced in detection coils disposed around the magnetic sample. Thus, the vibrating sample magnetometer derives magnetic properties of the magnetic sample based on a relational expression between electromotive force and magnetic properties. Magnetic properties of a magnetic sample deteriorate when an external load is applied. Therefore, for a magnetic sample that operates under pressure, it is necessary to measure magnetic properties of the magnetic sample being subjected to external force.

Patent Literature 1 discloses a vibrating sample magnetometer that includes a means for applying pressure to a measurement sample and a pressure measurement means for measuring the applied pressure. The vibrating sample magnetometer is configured such that the measurement sample can be vibrated while being subjected to pressure.

CITATION LIST

Patent Literature

Patent Literature 1: Japanese Patent Application Laid-open No. 2018-84463

SUMMARY OF INVENTION

Problem to be Solved by the Invention

When a strong magnetic field is externally applied to a magnetic sample being subjected to external pressure, deteriorated magnetic properties are slightly restored. The technique disclosed in Patent Literature 1 allows measurement of magnetic properties of a measurement sample being subjected to external stress. However, the magnetic properties are restored due to a strong magnetic field applied externally to the measurement sample when the magnetic field is swept. Therefore, there is a problem in that deterioration of magnetic properties due to application of external stress cannot be accurately measured.

The present disclosure has been made in view of the above, and an object of the present disclosure is to obtain a vibrating sample magnetometer capable of accurately measuring deterioration of magnetic properties due to external pressure applied to a measurement sample.

Means to Solve the Problem

In order to solve the above-described problem and achieve the object, a vibrating sample magnetometer of the present disclosure includes: a sample housing vibrating body that houses a measurement sample, and vibrates the measurement sample in a single direction; an excitation electromagnet that applies an external magnetic field to the measurement sample; a pressure application unit that applies pressure to the measurement sample; a pressure acquisition unit that measures the applied pressure; a magnetic property acquisition unit that detects an induced voltage caused by vibration of the measurement sample magnetized by the excitation electromagnet and acquires a magnetic property, the magnetic property indicating a relationship between a magnetic flux density and the external magnetic field, the magnetic flux density being a sum of magnetization of the measurement sample and the external magnetic field; and a control device that controls the external magnetic field and the pressure, and sweeps the external magnetic field. When acquiring the magnetic property of the measurement sample to which the pressure is being applied, the control device sets a first magnetic field value as a sweep start value, and sweeps the external magnetic field with a magnetic field equal to or less than the first magnetic field value. The first magnetic field value is smaller than a second magnetic field value acquired before the pressure is applied to the measurement sample, the second magnetic field value being a magnetic field value corresponding to a saturation magnetic flux density of the measurement sample to which the pressure is not being applied.

Effects of the Invention

The vibrating sample magnetometer of the present disclosure has the effect of enabling accurate measurement of deterioration of magnetic properties due to external pressure applied to a measurement sample.

BRIEF DESCRIPTION OF DRAWINGS

FIG. 10 is a process chart showing an example of a measurement procedure of a vibrating sample magnetometer according to a third embodiment.

FIG. 11 is a diagram illustrating magnetic properties obtained under the second measurement condition in a loaded state in the third embodiment.

DESCRIPTION OF EMBODIMENTS

Hereinafter, a vibrating sample magnetometer according to each embodiment will be described in detail with reference to the drawings.

First Embodiment

Figure 1:
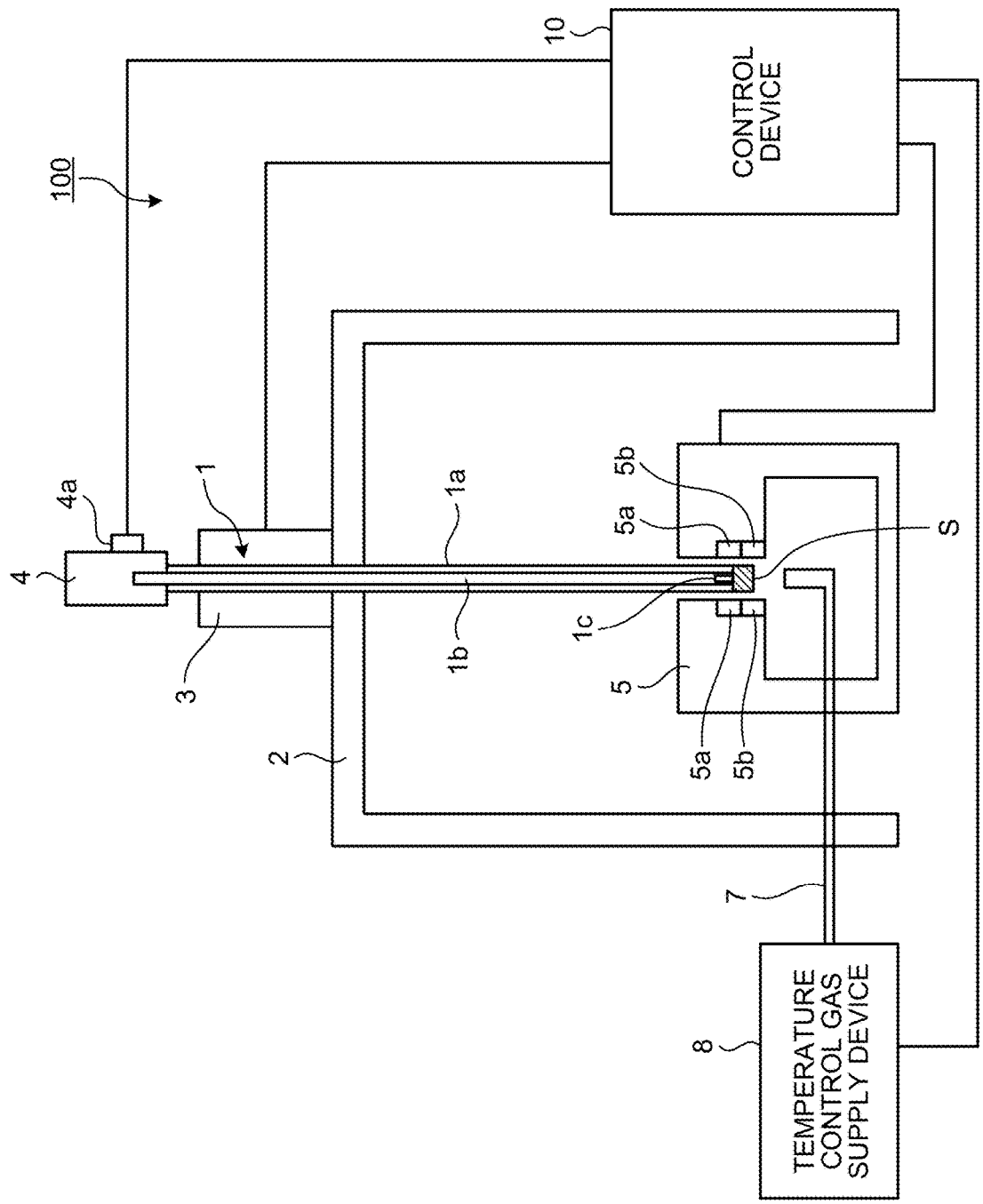
FIG. 1 is a diagram showing a schematic configuration example of a vibrating sample magnetometer according to a first embodiment.

FIG. 1 is a diagram showing a schematic configuration example of a vibrating sample magnetometer 100 according to a first embodiment. The vibrating sample magnetometer 100 includes a sample housing vibrating body 1, a support platform 2, a vibrating device 3, an external force application mechanism 4, a magnetic property imparting and measuring unit 5, a temperature control gas supply pipe 7, a temperature control gas supply device 8, and a control device 10.

The sample housing vibrating body 1 vibrates in a single direction. In this case, the sample housing vibrating body 1 vibrates up and down. The sample housing vibrating body 1 includes a sample storage portion 1a and a pressure application rod 1b. The sample storage portion 1a is hollow and cylindrical, and houses a measurement sample S. The pressure application rod 1b is inserted into the sample storage portion 1a, and applies pressure to the measurement sample S. The sample housing vibrating body 1 includes a temperature detection unit 1c that detects the temperature of the measurement sample S. The temperature of the measurement sample S detected by the temperature detection unit 1c is input to the control device 10. In addition, the sample housing vibrating body 1 includes a vibration detection unit (not illustrated) that detects a vibration state including the frequency and amplitude of vibration of the sample housing vibrating body 1. The vibration state of the sample housing vibrating body 1 detected by the vibration detection unit is input to the control device 10.

The vibrating device 3 vibrates the sample housing vibrating body 1 up and down. The support platform 2 is a platform for securing the vibrating device 3. The vibrating device 3 vibrates the sample housing vibrating body 1 up and down based on a vibration frequency and an amplitude specified by the control device 10.

The external force application mechanism 4 is connected to the pressure application rod 1b of the sample housing vibrating body 1, and applies external force to the measurement sample S by applying the external force to the pressure application rod 1b. The external force application mechanism 4 includes a pressure detection unit 4a. The pressure detection unit 4a is, for example, a load cell. The load cell converts force into an electrical signal by using a strain gauge. The pressure detection unit 4a detects a pressure applied to the measurement sample S by measuring a pressure received by the pressure application rod 1b from the measurement sample S. The pressure applied to the measurement sample S and detected by the pressure detection unit 4a is input to the control device 10.

The magnetic property imparting and measuring unit 5 includes an excitation electromagnet 5a and a detection coil 5b. The excitation electromagnet 5a applies an external magnetic field to the measurement sample S. The detection coil 5b detects an induced voltage caused by vibration of the measurement sample S magnetized by the excitation electromagnet 5a. The detection coil 5b is disposed in the vicinity of the measurement sample S. The induced voltage detected by the detection coil 5b is input to the control device 10.

The temperature control gas supply device 8 supplies a temperature control gas for controlling the temperature of the measurement sample S to the periphery of the measurement sample S housed in the sample housing vibrating body 1, via the temperature control gas supply pipe 7. It is possible to heat or cool the measurement sample S by blowing the temperature control gas onto the measurement sample S. The temperature of the temperature control gas is controlled by the control device 10.

In such a configuration, the measurement sample S is disposed at a tip of the sample storage portion 1a of the sample housing vibrating body 1. The temperature of the measurement sample S is detected by the temperature detection unit 1c of the sample housing vibrating body 1. The temperature of the measurement sample S is adjusted by the temperature control gas supplied from the temperature control gas supply device 8. The pressure application rod 1b is inserted into the sample storage portion 1a, and the measurement sample S is secured to the sample storage portion 1a by the pressure application rod 1b. In this state, the sample housing vibrating body 1 is vibrated in a vertical direction by the vibrating device 3. This vibration state is detected by the vibration detection unit (not illustrated). Pressure is applied to the measurement sample S in the same direction as a direction of the vibration, by means of the external force application mechanism 4 and the pressure application rod 1b. When the pressure acts on the measurement sample S, a force in an opposite direction acts on the pressure application rod 1b as a reaction. Pressure acting on the pressure application rod 1b is detected by the pressure detection unit 4a of the external force application mechanism 4. An induced voltage is caused from vibration in the measurement sample S. This induced voltage is detected by the detection coil 5b of the magnetic property imparting and measuring unit 5. In addition, the measurement sample S is magnetized by an external magnetic field applied with the excitation electromagnet 5a.

Figure 2:
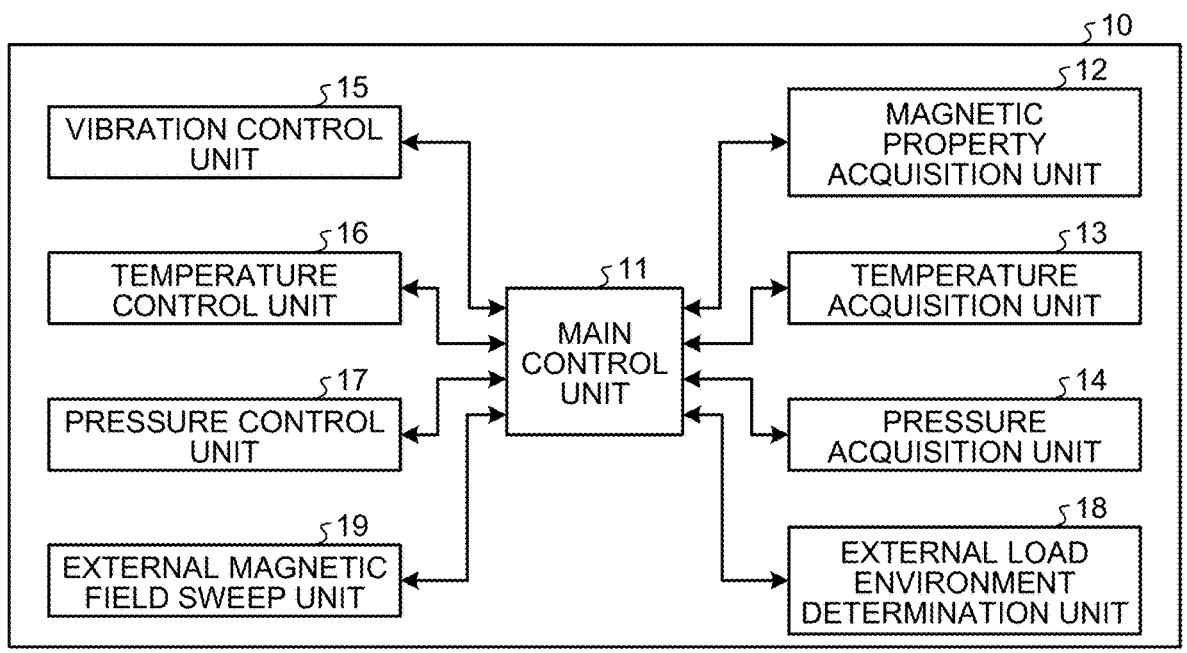
FIG. 2 is a block diagram showing a functional configuration example of a control device of the vibrating sample magnetometer according to the first embodiment.

The control device 10 controls the vibrating device 3, the external force application mechanism 4, the magnetic property imparting and measuring unit 5, and the temperature control gas supply device 8. FIG. 2 is a block diagram showing a functional configuration example of the control device 10 of the vibrating sample magnetometer 100 according to the first embodiment. The control device 10 includes a main control unit 11, a magnetic property acquisition unit 12, a temperature acquisition unit 13, a pressure acquisition unit 14, a vibration control unit 15, a temperature control unit 16, a pressure control unit 17, an external load environment determination unit 18, and an external magnetic field sweep unit 19.

On the basis of a result of measuring magnetization of the measurement sample S obtained from the detection coil 5b, the magnetic property acquisition unit 12 calculates a magnetic property indicating a correspondence relationship between a magnetic flux density B, which is a sum of the magnetization of the measurement sample S and an external magnetic field, and an external magnetic field (magnetic field) H. The magnetic property acquisition unit 12 sends the calculated magnetic property to the main control unit 11.

The temperature acquisition unit 13 calculates a temperature T of the measurement sample S based on a result of detection of the temperature of the measurement sample S obtained from the temperature detection unit 1c, and sends the calculated temperature T to the main control unit 11.

The pressure acquisition unit 14 calculates an external pressure (pressure) P applied to the measurement sample S based on a pressure detection result regarding the pressure of the measurement sample S detected by the pressure detection unit 4a, and sends the calculated external pressure P to the main control unit 11.

The vibration control unit 15 controls the vibrating device 3. The vibration control unit 15 controls the vibrating device 3 by providing feedback on a vibration state of the sample housing vibrating body 1 acquired from the vibration detection unit (not illustrated), to control the vibration frequency, amplitude, vibration start time, and vibration end time of vertical vibration of the sample housing vibrating body 1.

The temperature control unit 16 acquires, from the main control unit 11, the temperature T of the measurement sample S calculated by the temperature acquisition unit 13. The temperature control unit 16 controls the temperature control gas supply device 8 by providing feedback on the temperature T of the measurement sample S, to control the temperature of the temperature control gas to be supplied from the temperature control gas supply device 8.

The pressure control unit 17 acquires, from the main control unit 11, the pressure P applied to the measurement sample S calculated by the pressure acquisition unit 14. The pressure control unit 17 controls the external force application mechanism 4 by providing feedback on the pressure P applied to the measurement sample S, to control the pressure application rod 1b such that the specified pressure P is applied to the measurement sample S.

The external load environment determination unit 18 derives a sweep start value Hs and a sweep end value He of the external magnetic field H, on the basis of a result of measurement of the magnetic property indicating the correspondence relationship between the magnetic flux density B and the external magnetic field H, and the external load environment determination unit 18 transmits the derived values to the main control unit 11.

The external magnetic field sweep unit 19 acquires, from the main control unit 11, the sweep start value Hs and the sweep end value He of the external magnetic field H. The external magnetic field sweep unit 19 transmits the sweep start value Hs and the sweep end value He of the external magnetic field H to the excitation electromagnet 5a, and performs sweep control for the excitation electromagnet 5a.

The main control unit 11 controls each of functional units including the magnetic property acquisition unit 12, the temperature acquisition unit 13, the pressure acquisition unit 14, the vibration control unit 15, the temperature control unit 16, the pressure control unit 17, the external load environment determination unit 18, and the external magnetic field sweep unit 19, by transmitting control signals to the functional units on the basis of information acquired from the functional units.

Figure 3:
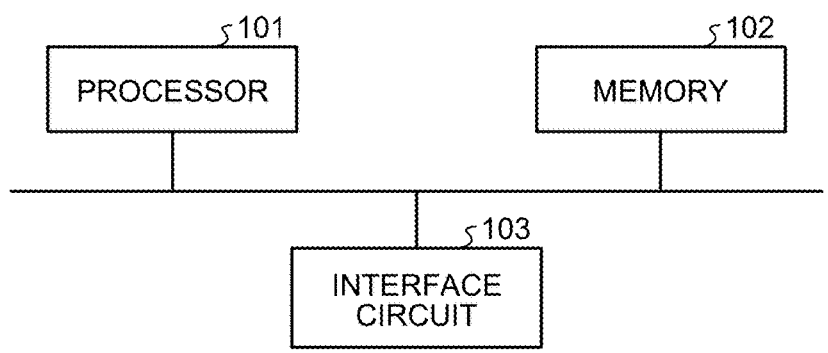
FIG. 3 is a block diagram showing an example of a hardware configuration of the control device of the vibrating sample magnetometer according to the first embodiment.

FIG. 3 is a block diagram showing an example of a hardware configuration of the control device 10 of the vibrating sample magnetometer 100 according to the first embodiment. The control device 10 can be implemented by a processor 101, a memory 102, and an interface circuit 103 illustrated in FIG. 3. Examples of the processor 101 include a central processing unit (CPU) (also referred to as a processing device, an arithmetic device, a microprocessor, a microcomputer, or a digital signal processor (DSP)) and a system large-scale integration (LSI). Examples of the memory 102 include a random access memory (RAM) and a read only memory (ROM).

The control device 10 is implemented by the processor 101 reading and executing a program for executing the operation of the control device 10, stored in the memory 102. It can also be said that this program causes a computer to execute a procedure or a method of the control device 10. The memory 102 is also used as a temporary memory when the processor 101 executes various types of processing. Note that some of the functions of the control device 10 may be implemented by dedicated hardware, and some of the other functions thereof may be implemented by software or firmware.

It is known that when pressure is applied externally to the measurement sample S that is a magnetic material, magnetic properties are deteriorated. Meanwhile, the present inventors have newly found that when pressure (stress) is applied externally to the measurement sample S and a strong magnetic field is then applied externally to the measurement sample S when magnetic properties have been deteriorated, the deteriorated magnetic properties are partially or completely restored. Thus, when an external magnetic field that is too strong is applied to the measurement sample S to which pressure is being applied externally, the deteriorated magnetic properties are partially or completely restored.

When measuring magnetic properties of the measurement sample S to which pressure is being applied, the vibrating sample magnetometer of Patent Literature 1 acquires magnetic properties while sweeping an external magnetic field to a strong magnetic field side, and then sweeping the external magnetic field to a low magnetic field side while the pressure is being applied to the measurement sample S. However, in this method, magnetic properties deteriorated by pressure applied externally to the measurement sample S cannot be accurately acquired, and instead, magnetic properties are acquired after partial or complete restoration of the magnetic properties deteriorated by the applied pressure.

In a product including magnetic material, such as a motor device, magnetic properties are deteriorated under the influence of stress due to centrifugal force that is caused by rotation of a motor. However, general motor devices have no mechanism for restoring deteriorated magnetic properties. Therefore, if it is not possible to accurately grasp the magnetic properties of the magnetic material deteriorated only by the influence of stress, the motor performance of a motor device being used cannot be accurately evaluated.

Thus, in order to accurately grasp the state of deterioration of magnetic properties due to the influence of stress, the vibrating sample magnetometer 100 of the first embodiment specifies, as the sweep start value Hs, a magnetic field that is sufficiently weak to avoid restoring the magnetic properties deteriorated by externally applied pressure. Them, the vibrating sample magnetometer 100 applies, to the measurement sample S, a magnetic field equal to or less than the specified sweep start value Hs to sweep the magnetic field.

Figure 4:
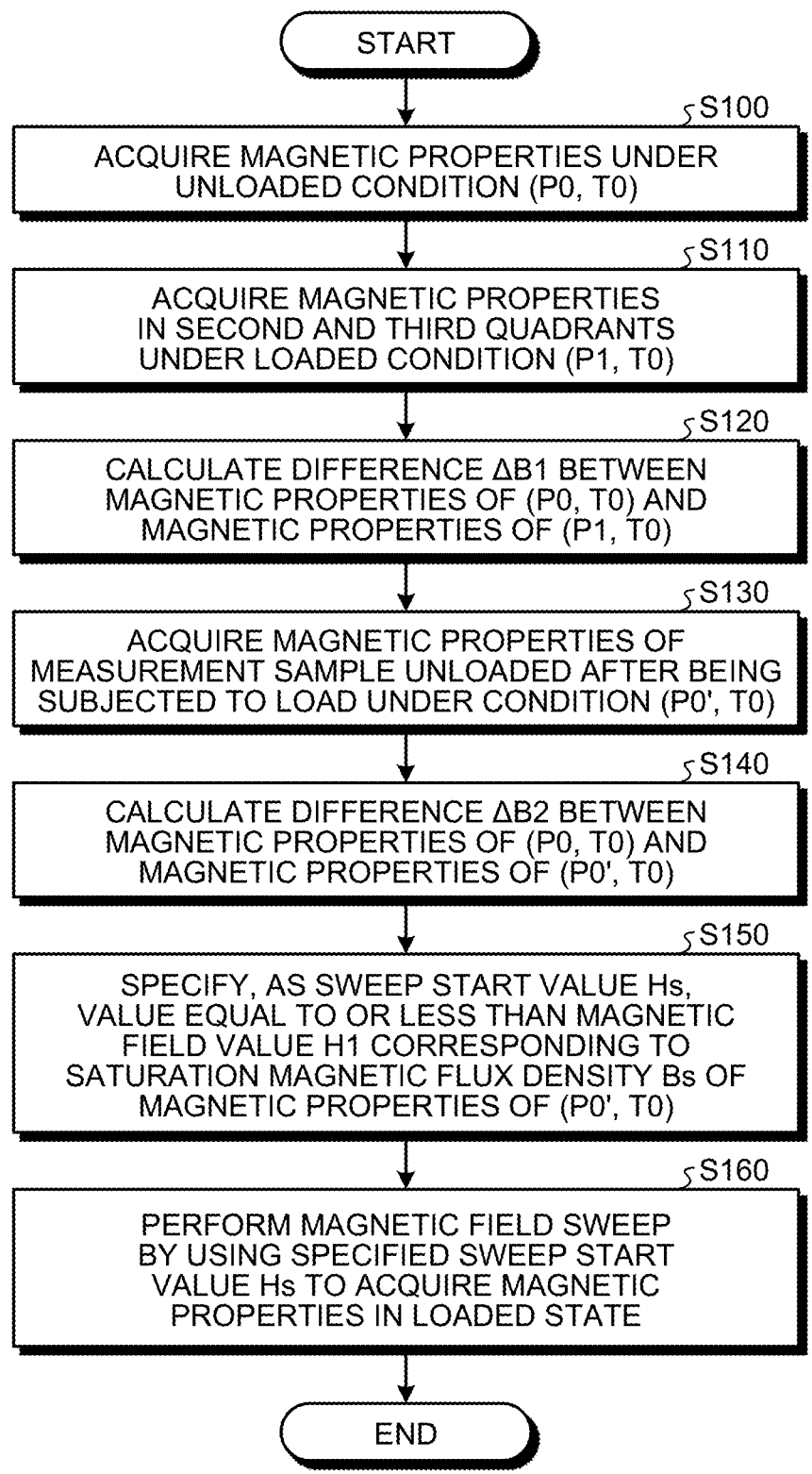
FIG. 4 is a process chart showing an example of a measurement procedure of the vibrating sample magnetometer according to the first embodiment.

In order to accurately grasp the state of deterioration of magnetic properties due to the influence of pressure, the vibrating sample magnetometer 100 of the first embodiment performs, for example, the following measurement. FIG. 4 is a process chart showing an example of a measurement procedure of the vibrating sample magnetometer 100 according to the first embodiment.

First, the vibration control unit 15 controls the vibrating device 3, and specifies a vibration frequency and an amplitude such that the sample housing vibrating body 1 vibrates up and down at the specified vibration frequency and amplitude. The temperature control unit 16 controls the temperature control gas supply device 8 such that the temperature T of the measurement sample S becomes T0. The temperature "T0" is, for example, 25° C. The pressure control unit 17 controls the external force application mechanism 4 such that the pressure P to be applied to the measurement sample S becomes a pressure (pressure P=P0=0 MPa) in an unloaded state. As above, the control device 10 sets a measurement condition of the measurement sample S to a first measurement condition (P0,T0) that is in the unloaded state. Thereafter, the external magnetic field sweep unit 19 performs full-loop magnetic-field sweep control of controlling the excitation electromagnet 5*a* to apply the external magnetic field (magnetic field) H to the measurement sample S in an initial state. The magnetic property acquisition unit 12 acquires full-loop magnetic properties of the measurement sample S generated by the magnetic-field sweep control, based on a measurement result of magnetization of the measurement sample S obtained from the detection coil 5*b* (step S100). The measurement sample in the initial state refers to a measurement sample to which no load has been applied before.

Figure 5:
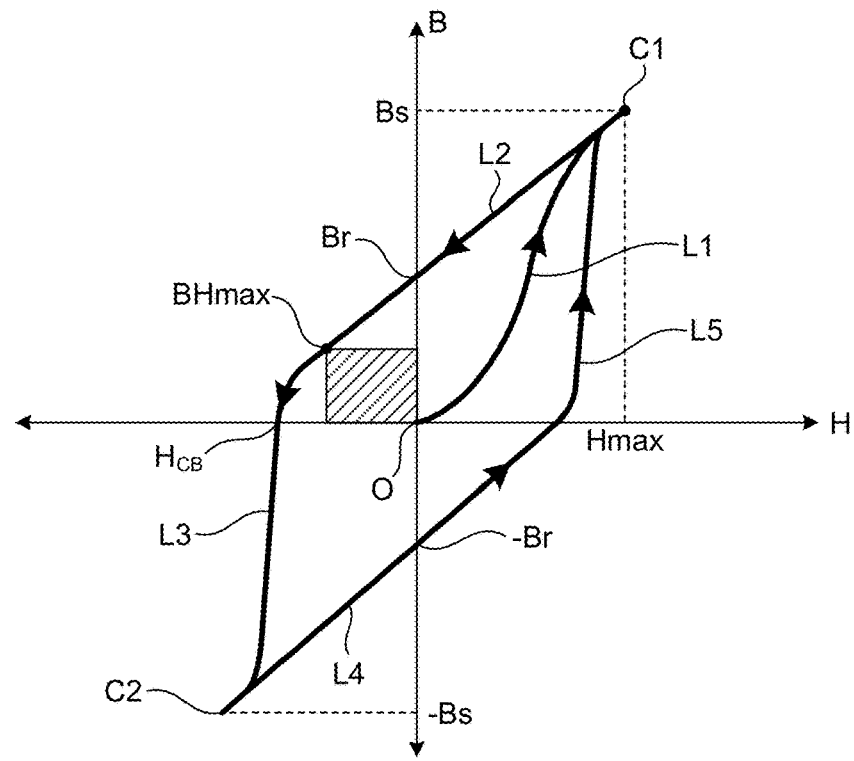
FIG. 5 is a diagram illustrating magnetic properties obtained under a first measurement condition in an unloaded state in the first embodiment.

FIG. 5 is a diagram illustrating magnetic properties (B-H loop) obtained under the first measurement condition (P0, T0) in the unloaded state in the first embodiment. In FIG. 5, the vertical axis represents the magnetic flux density B (unit: tesla), and the horizontal axis represents the magnetic field H (unit: A/m). The magnetic properties under this measurement condition are values generally shown in a catalog of magnetic materials.

Full-loop magnetic-field sweep control is performed under the first measurement condition (P0,T0) as follows. First, the external magnetic field H is applied to the measurement sample S that is in the initial state such that the external magnetic field H increases from zero (H=0) to Hlmt. The value Hlmt is a positive-side limit value of the excitation electromagnet 5*a* and the detection coil 5*b* of the magnetic property imparting and measuring unit 5, which is a measuring instrument. As a result, the measurement sample S is magnetized, and the magnetic flux density B increases along a line L1 from the origin O, where B=0, to a point C1 having a saturation magnetic flux density Bs. The magnetic field H corresponding to the saturation magnetic flux density Bs is also referred to as a maximum magnetization force Hmax. The maximum magnetization force Hmax of the magnetic properties obtained under the first measurement condition (P0,T0) that is in the unloaded state, corresponds to a second magnetic field value in the claims.

Next, the external magnetic field H is applied to the measurement sample S such that the external magnetic field H decreases from the positive-side limit value "Hlmt" to zero (H=0). As a result, the measurement sample S is demagnetized, and the magnetic flux density B decreases along a line L2 from the point C1, where B=Bs, to a residual magnetic flux density Br.

Next, the external magnetic field H is applied to the measurement sample S in a reverse direction such that the external magnetic field H increases from zero (H=0) to a negative-side limit value "–Hlmt" of the measuring instrument. As a result, the magnetic flux density B increases along a line L3 from the residual magnetic flux density Br to a point C2 having a saturation magnetic flux density "–Bs" via a holding force $H_{CB}$ where B=0. The symbol "BHmax" represents a point indicating a maximum energy product that is a maximum value of the product of the magnetic flux density B and the magnetic field H on a demagnetization curve.

Next, the external magnetic field H is applied to the measurement sample S such that the external magnetic field H decreases from the negative-side limit value "–Hlmt" to zero (H=0). As a result, the measurement sample S is demagnetized, and the magnetic flux density B decreases along a line L4 from the point C2, where B=–Bs, to a residual magnetic flux density "–Br".

Next, the external magnetic field H is applied to the measurement sample S in a reverse direction such that the external magnetic field H increases from zero (H=0) to the positive-side limit value "Hlmt" of the measuring instrument. As a result, the magnetic flux density B increases along a line L5 from the residual magnetic flux density "–Br" to the point C1 having the saturation magnetic flux density "Bs" via the holding force "$H_{CB}$" where B=0.

Figure 6:
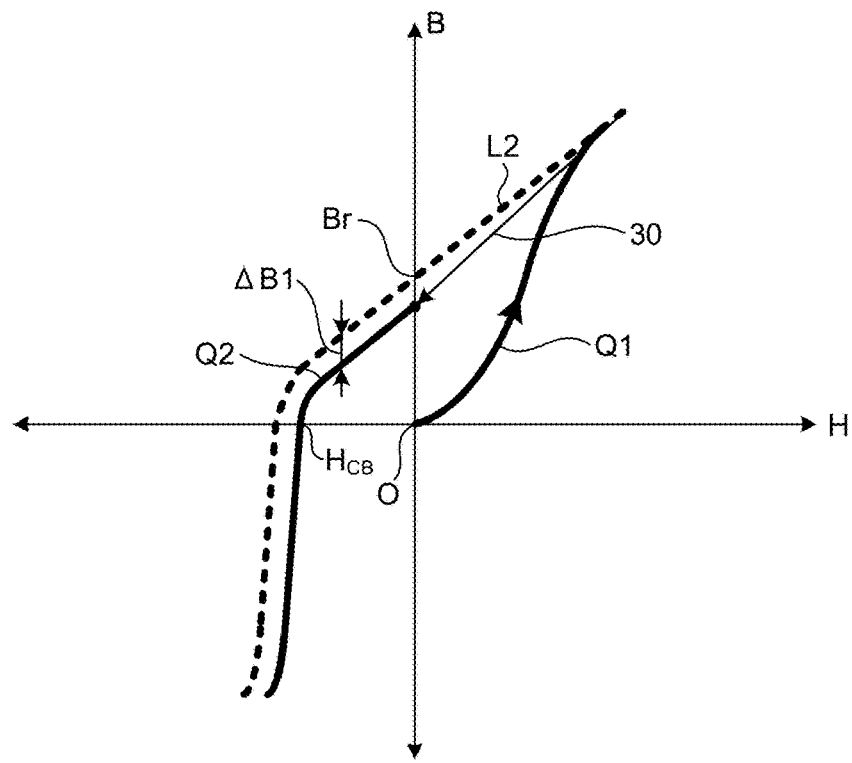
FIG. 6 is a diagram illustrating magnetic properties obtained under a second measurement condition in a loaded state in the first embodiment.

FIG. 6 is a diagram illustrating magnetic properties (B-H loop) obtained under a second measurement condition (P1, T0) in a loaded state in the first embodiment. A broken line L2 in FIG. 6 corresponds to the line L2 of the unloaded state in FIG. 5. Next, the control device 10 controls the temperature control gas supply device 8, the external force application mechanism 4, and the magnetic property imparting and measuring unit 5 to apply the external magnetic field H to the measurement sample S such that the external magnetic field H changes from zero (H=0) to the positive-side limit value "Hlmt" of the measuring instrument, while keeping the measurement condition of the measurement sample S to the first measurement condition (P0,T0) that is in the unloaded state. As a result, magnetic properties are acquired as indicated by a line Q1 in FIG. 6.

Next, the control device 10 sets the measurement condition of the measurement sample S to the second measurement condition (P1,T0) that is in the loaded state. For example, the pressure P1=100 MPa, and the temperature T0=25° C. In addition, the external load environment determination unit 18 of the control device 10 sets the sweep start value Hs of the external magnetic field H to zero (H=0), and sets the sweep end value He of the external magnetic field H to the negative-side limit value "–Hlmt" described above. Then, the control device 10 executes sweep control after the temperature T and the pressure P of the measurement sample S are stabilized. As a result, sweep control for the external magnetic field H is performed when an external load is applied to the measurement sample S. According to the magnetic-field sweep control with the external magnetic field H changing from zero (H=0) to the negative-side limit value "–Hlmt" under the second measurement condition (P1,T0), a portion of the magnetic properties in the first quadrant is skipped as indicated by an arrow 30 in FIG. 6. Furthermore, a demagnetization curve corresponding to magnetic properties in the second quadrant and the third quadrant are acquired as indicated by a line Q2 (step S110).

When the magnetic properties are acquired in the loaded state under the second measurement condition (P1,T0), it is necessary to set, as the sweep start value Hs, an external magnetic field that is sufficiently weak to prevent magnetic properties from being restored. A maximum value of the external magnetic field that is sufficiently weak to prevent magnetic properties from being restored has not yet been determined under the second measurement condition (P1, T0). Thus, a simplest method is adopted in which the sweep start value Hs is set to zero (H=0). Therefore, an external magnetic field larger than zero (H=0) may be set as the sweep start value Hs as long as the external magnetic field is sufficiently weak to prevent magnetic properties from being restored.

Next, the external load environment determination unit 18 of the control device 10 calculates a difference ΔB1 between the magnetic properties under the first measurement condition (P0,T0) and the magnetic properties under the second measurement condition (P1,T0) (step S120). The demagnetization properties of the measurement sample S to which pressure (stress) is being applied can be grasped from the difference ΔB1.

Figure 7:
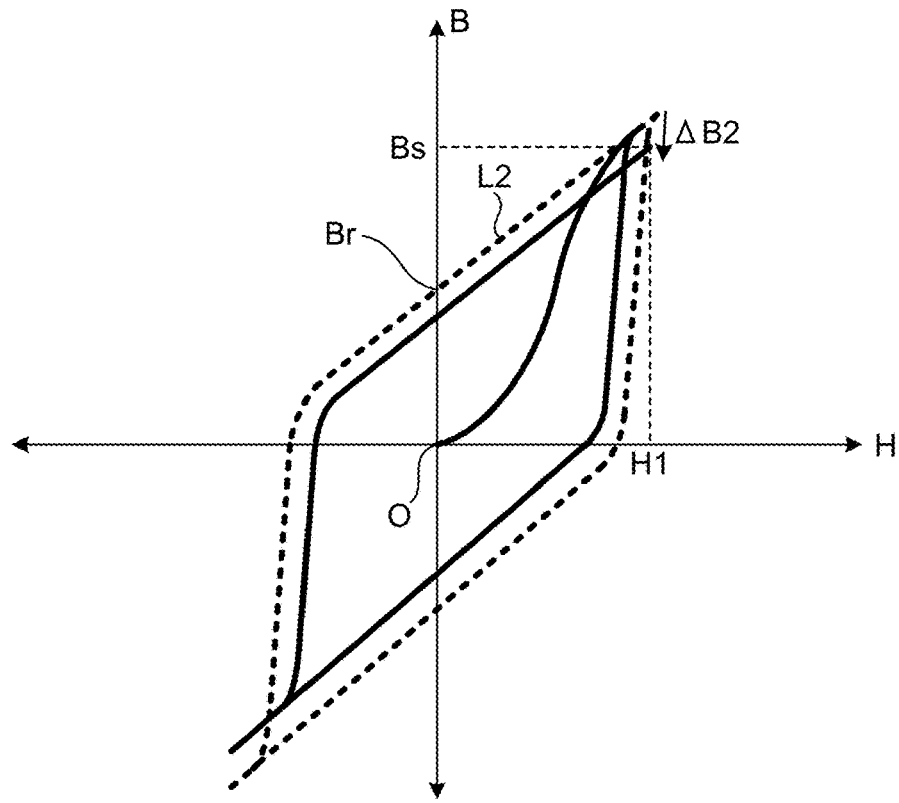
FIG. 7 is a diagram illustrating magnetic properties obtained when a measurement sample is unloaded after being subjected to a load in the first embodiment.

FIG. 7 is a diagram illustrating magnetic properties obtained when the measurement sample S is unloaded after being subjected to a load in the first embodiment. A broken line L2 in FIG. 7 corresponds to the line L2 in FIG. 5. After acquiring the magnetic properties under the second measurement condition (P1,T0), the control device 10 sets again the measurement condition of the measurement sample S to a third measurement condition (P0',T0) that that is in the unloaded state. For example, it is set that the pressure P0'=0 MPa, and the temperature T0=25° C. The third measurement condition and the first measurement condition are identical in pressure P and temperature T. However, the third measurement condition is different from the first measurement condition in that the measurement sample S is unloaded after being subjected to a load. Therefore, the measurement condition concerned is referred to as the third measurement condition, and pressure is represented as P=P0'. In addition, as described with reference to FIG. 5, the control device 10 performs full-loop magnetic-field sweep control of controlling the excitation electromagnet 5a to apply the external magnetic field H to the measurement sample S (step S130). That is, the external magnetic field is swept from zero (H=0) to the positive-side limit value "Hlmt", swept from the positive-side limit value "Hlmt" to the negative-side limit value "−Hlmt", and swept from the negative-side limit value "−Hlmt" to the positive-side limit value "Hlmt". According to the magnetic-field sweep control performed again under the third measurement condition (P0',T0), it is possible to acquire the full-loop B-H loop regarding the measurement sample S from which stress has been unloaded, as illustrated in FIG. 7.

Here, the holding force of a magnet is considered. A large number of crystal grains are included in a magnet, and each crystal grain has a magnetic domain structure. A neodymium magnet is produced by the compression molding and sintering of magnet powder, but does not have holding force immediately after production, so that magnetic properties are not exhibited. When a magnetic field is applied to a magnet from an external coil or the like, the magnetic domain orientations of crystal grains are aligned in a single direction, so that magnetic properties are exhibited. Thus, what is called a magnet is obtained. Since magnetic properties correspond to the sum of magnetic domain structures of crystal grains, the more crystal grains with magnetic domain structures aligned in a single direction are present, the higher the magnetic properties are.

Incidentally, it is conceivable that weakened magnetic properties of a magnet, that is, demagnetization will be caused by a shift from a configuration in which the magnetic domain orientations of crystal grains are aligned in a single direction to a configuration in which the magnetic domain orientations of some of the crystal grains are not aligned, or a configuration in which a magnetic domain itself has changed to a plurality of magnetic domains (multi-domain structure). In order to align, in a single direction, the magnetic domains of the crystal grains of the magnet oriented in various directions, it is necessary to externally apply a magnetic field to the magnet by means of an external coil or the like. When a magnetic field is applied externally to the magnet, there is a possibility that crystal grains having magnetic domains oriented in various directions or crystal grains with a multi-domain structure can be reproduced as crystal grains with a single-domain structure in which magnetic domains are oriented in a single direction (reversible demagnetization). Meanwhile, there are also crystal grains with a magnetic domain structure that cannot be changed into a single-domain structure (irreversible demagnetization), such as crystal grains having magnetic domains oriented in different directions due to an external load, such as stress, or crystal grains with a multi-domain structure in which magnetic domains are oriented in various directions.

Here, considered is demagnetization of the magnetic properties of the measurement sample S to which pressure is applied. As described above, magnet demagnetization includes reversible demagnetization and irreversible demagnetization. In the reversible demagnetization, when a magnetic field is applied externally to the measurement sample S again, magnetic domain structures are aligned, and magnetic properties are reproduced. That is, in the reversible demagnetization, magnetic properties are restored from a demagnetized state. Meanwhile, in the irreversible demagnetization, even when a magnetic field is applied externally to the measurement sample S again, the magnetic domain structures are not aligned, and magnetic properties are not reproduced. That is, in the irreversible demagnetization, magnetic properties are not restored from the demagnetized state. Demagnetization of the magnetic properties of the measurement sample S to which stress is applied includes reversible demagnetization and irreversible demagnetization.

The external load environment determination unit 18 of the control device 10 calculates a difference ΔB2 between magnetic properties under the first measurement condition (P0,T0) and magnetic properties under the third measurement condition (P0',T0) (step S140). As a result, it is possible to detect the difference ΔB2 between the magnetic properties of the measurement sample S before and after being subjected to pressure. Here, if the difference ΔB2 occurs, it can be confirmed that the change in magnetic property due to the pressure applied to the measurement sample S is an irreversible change.

In addition, the external load environment determination unit 18 of the control device 10 acquires the saturation magnetic flux density Bs (see FIG. 7) of the magnetic properties under the third measurement condition (P0',T0), and further acquires a magnetic field value H1 (see FIG. 7) corresponding to the saturation magnetic flux density Bs. Furthermore, the external load environment determination unit 18 of the control device 10 selects, as a first magnetic field value Ha, any magnetic field value from among values of the external magnetic field H satisfying H≤H1. Then, the external load environment determination unit 18 specifies the selected first magnetic field value Ha as the sweep start value Hs for acquiring magnetic properties in the loaded state (step S150). That is, the external load environment determination unit 18 of the control device 10 sets, as the sweep start value Hs, the first magnetic field value Ha. The value Ha is a magnetic field value equal to or less than the magnetic field value H1, which corresponds to the saturation magnetic flux density Bs in the magnetic properties in the unloaded state.

In this way, when the first magnetic field value Ha is specified as the sweep start value Hs for acquiring magnetic properties in the loaded state, the control device performs magnetic field sweep by using the specified sweep start value Hs (=Ha) to acquire the magnetic properties of the measurement sample S in the loaded state (step S160). In the example of FIG. 6, the sweep start value Hs is set to zero (H=0). Here, the sweep start value Hs is set such that H=Ha, and the magnetic properties in the loaded state are acquired similarly to FIG. 6. As a result, if the first magnetic field value Ha is set to a value that allows acquisition of magnetic properties in the first quadrant, the magnetic properties in the first quadrant can also be acquired. In addition, when magnetic properties in the loaded state returning from the third quadrant to the first quadrant via the fourth quadrant are acquired, the value H just needs to be set as the sweep end value He such that H=Ha. Furthermore, when magnetic properties of another measurement sample S made of the same material, including magnetic properties in the first quadrant, are acquired thereafter, the sweep start value Hs in step S110 may be set such that H=Ha. Then, the processing of steps S130 to S160 may be omitted so that the procedure is terminated in step S120.

As described above, in the first embodiment, after the pressure P is applied to the measurement sample S, the applied pressure P is unloaded from the measurement sample S, and magnetic properties of the measurement sample S from which the pressure P has been unloaded are acquired. Furthermore, the sweep start value Hs is set as the first magnetic field value Ha that is equal to or less than the magnetic field value H1, which corresponds to the saturation magnetic flux density Bs in the magnetic properties of the measurement sample S from which the pressure P has been unloaded. Then, the magnetic properties (B-H characteristics) of the measurement sample S starting from the sweep start value Hs are acquired. Therefore, a strong magnetic field is not applied externally to the measurement sample S at the time of magnetic field sweep. As a result, it is possible to accurately measure deterioration of the magnetic properties due to application of the external stress. This makes it possible to accurately estimate the deterioration state of the magnetic properties of magnetic material included in a motor device or the like.

Second Embodiment

Here, a demagnetizing field of the measurement sample S is considered. A magnetized magnetic body also generates a magnetic field inside the magnetic body. A magnet has two magnetic poles including the N-pole and the S-pole, and magnetic flux goes out of the magnet from the N-pole and returns to the S-pole. However, separately from the magnetic flux leaking to the outside, magnetic flux flowing from the N-pole to the S-pole exists inside the magnet. The direction of the magnetic flux inside the magnet is opposite to the direction of the magnetic flux returning from the outside of the magnet. Therefore, such a magnetic field is referred to as a demagnetizing field.

In order to accurately evaluate magnetic properties of the measurement sample S, it is necessary to express the magnetic properties with a B-H loop from which the influence of the demagnetizing field is removed. However, in a vibrating sample magnetic force measuring apparatus that measures an open magnetic circuit, it is necessary to make correction for the influence of the demagnetizing field. Otherwise, unlike a B-H loop measured in a closed magnetic circuit that is not affected by the demagnetizing field, magnetic properties are not accurately evaluated.

In the measurement of an open magnetic circuit, there is a demagnetizing field correction technique as a method of creating a B-H loop from which the influence of the demagnetizing field is removed. The demagnetizing field correction technique is a technique for correcting a distorted B-H loop measured in an open magnetic circuit to a loop having a shape similar to that of a B-H loop measured in a closed magnetic circuit. There are various methods known as the demagnetizing field correction technique.

As one of demagnetizing field correction methods, there is a method of performing algorithm calculation for predicting a B-H loop of closed magnetic circuit measurement from a B-H loop of open magnetic circuit measurement. When such a correction method is applied, it is possible to increase the prediction accuracy of the B-H loop of closed magnetic circuit measurement, as the number of measurement points of B-H characteristics in the first quadrant of a B-H loop increases.

Figure 8:
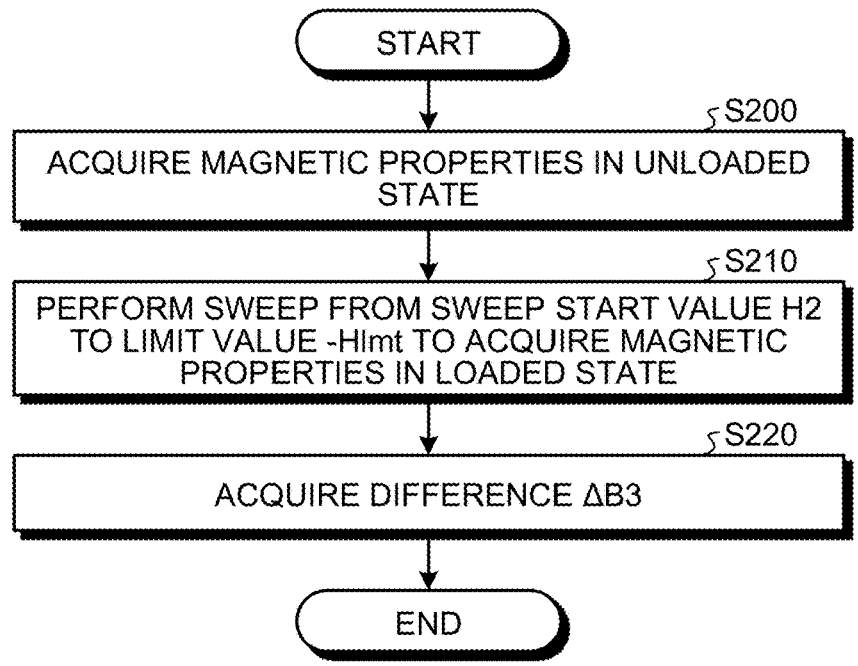
FIG. 8 is a process chart showing an example of a measurement procedure of a vibrating sample magnetometer according to a second embodiment.
Figure 9:
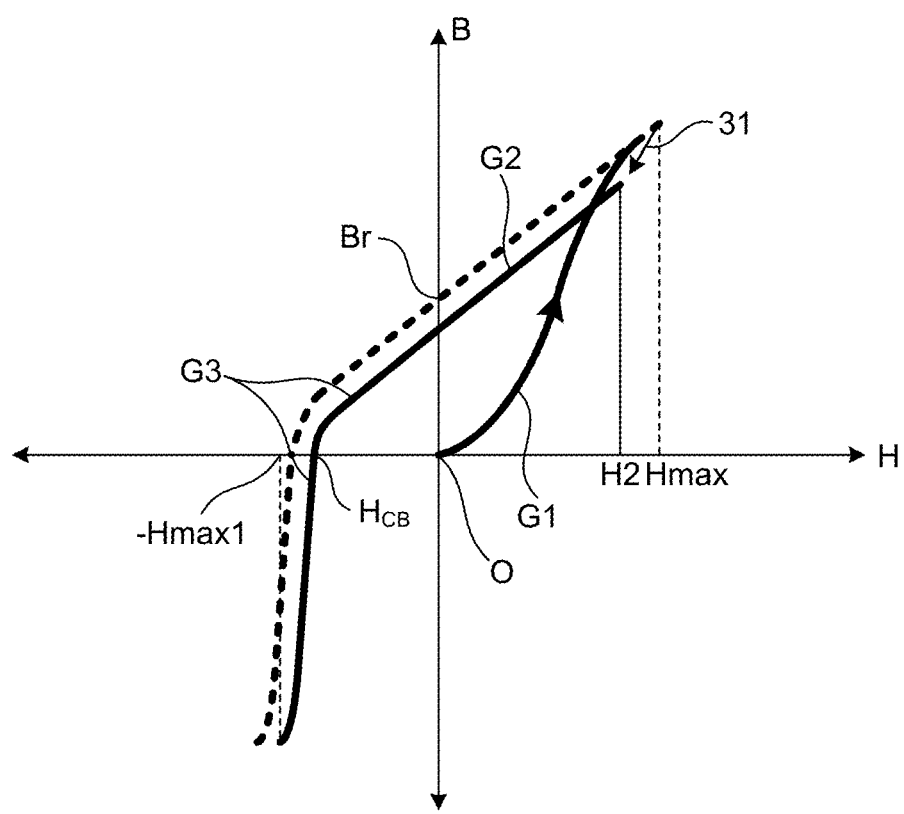
FIG. 9 is a diagram illustrating magnetic properties obtained under the second measurement condition corresponding to a loaded state in the second embodiment.

Therefore, in order to increase the number of measurement points of the B-H characteristics in the first quadrant, measurement is performed in a second embodiment as follows. FIG. 8 is a process chart showing an example of a measurement procedure of a vibrating sample magnetometer according to a second embodiment. FIG. 9 is a diagram illustrating magnetic properties (B-H loop) obtained under the second measurement condition (P1,T0) corresponding to a loaded state in the second embodiment. The measurement procedure of the second embodiment will be described below with reference to FIGS. 5, 8, and 9.

First, as described with reference to FIG. 5, the control device 10 sets the measurement condition of the measurement sample S in the initial state to the first measurement condition (P0,T0) described above that is in the unloaded state. The pressure P0=0 MPa, and the temperature T0=25° C. In addition, the control device 10 performs full-loop magnetic-field sweep control of controlling the excitation electromagnet 5a to apply the external magnetic field H to the measurement sample S. That is, the external magnetic field is swept from zero (H=0) to the positive-side limit value "Hlmt", swept from the positive-side limit value "Hlmt" to the negative-side limit value "−Hlmt", and swept from the negative-side limit value "−Hlmt" to the positive-side limit value "Hlmt". According to the magnetic-field sweep control under the first measurement condition (P0, T0), a full-loop B-H loop can be acquired as illustrated in FIG. 5 (step S200).

Next, the control device 10 controls the temperature control gas supply device 8, the external force application mechanism 4, and the magnetic property imparting and measuring unit 5 to apply the external magnetic field H to the measurement sample S such that the external magnetic field H changes from zero (H=0) to the positive-side limit value "Hlmt" of the measuring instrument, while keeping the measurement condition of the measurement sample S to the first measurement condition (P0,T0) that is in the unloaded state. As a result, magnetic properties are acquired as indicated by a line G1 in FIG. 9.

Next, the control device 10 reduces the external magnetic field H to a magnetic field value H2 which is the sweep start value Hs. As indicated by an arrow 31 in FIG. 9, a value selected as the magnetic field value H2 is smaller than the maximum magnetization force Hmax of the previously measured magnetic properties illustrated in FIG. under the first measurement condition (P0,T0) that is in the unloaded state. The maximum magnetization force Hmax is a value of the magnetic field H corresponding to the saturation magnetic flux density (maximum magnetic flux density) Bs. Here, a value that is 5% lower than the maximum magnetization force Hmax is selected as the magnetic field value H2. In addition, the control device sets the sweep end value He of the external magnetic field to the negative-side limit value "−Hlmt".

Next, the control device 10 sets the measurement condition of the measurement sample S to the second measurement condition (P1,T0) that is in the loaded state. For example, the pressure P1=100 MPa, and the temperature T0=25° C. After the temperature and pressure of the measurement sample S are stabilized, the control device 10 executes magnetic-field sweep control with the external magnetic field H changing from the magnetic field value H2 to the sweep end value "−Hlmt" in the loaded state. As a result, while an external load is being applied to the measurement sample S, the magnetic-field sweep control is executed with the external magnetic field H changing from the magnetic field value H2 to the sweep end value "−Hlmt". According to the magnetic-field sweep control with the external magnetic field H changing from H2 (H=H2) to the negative-side limit value "−Hlmt" under the second measurement condition (P1,T0), a demagnetization curve as magnetic properties in the first quadrant is acquired as indicated by a line G2 in FIG. 9, and a demagnetization curve as magnetic properties in the second quadrant and the third quadrant is acquired as indicated by a line G3 (step S210).

Next, the control device 10 calculates a difference ΔB3 between the magnetic properties under the first measurement condition (P0,T0) and the magnetic properties under the second measurement condition (P1,T0) (step S220). The demagnetization properties of the measurement sample S to which stress is being applied can be grasped based on the difference ΔB3.

Here, it is desirable to select, as the magnetic field value H2, different values depending on resistance to demagnetization of the measurement sample S regarding the external load. For example, when the demagnetization resistance of the measurement sample S is low, and a maximum magnetization force Hmax1 indicated by the B-H characteristics under conditions of P1=100 MPa and T0=25° C. is demagnetized by 7% as compared with the maximum magnetization force Hmax in the unloaded state, a value of, for example, 10% that is lower by 7% or more than the maximum magnetization force Hmax is selected as the magnetic field value H2. As illustrated in FIG. 9, the maximum magnetization force Hmax1 is acquired from the demagnetization curve in the third quadrant. This is because, if a value is selected as the magnetic field value H2 such that H2>Hmax1, there is a possibility that the magnetic properties of the measurement sample S may be restored, which may result in that demagnetization properties due to an external load cannot be accurately evaluated.

In order to increase the number of measurement points of B-H characteristics in the first quadrant of the magnetization curve as much as possible, it is desirable to set the magnitude of the magnetic field value H2 as large as possible within the extent that the magnetic properties of the measurement sample S are not restored. Therefore, it is necessary to improve the accuracy of selection of the magnetic field value H2 by the external load environment determination unit 18. For this purpose, an effective method is to predict the magnetic field value H2 with reference to B-H characteristic data acquired by measurement of a sample that is equivalent to the measurement sample S. It is possible to improve prediction accuracy of this method by using machine learning.

As described above, in the second embodiment, magnetic-field sweep control is performed in the loaded state after selecting, as the magnetic field value H2 which is the sweep start value Hs, a value that is smaller by X percent than the magnetization force Hmax that is the maximum value in the unloaded state. Therefore, a strong magnetic field is not applied externally to the measurement sample S at the time of magnetic field sweep. As a result, it is possible to accurately measure the deterioration state of magnetic properties of the measurement sample S to which an external load is applied. In addition, since magnetic properties in the first quadrant can also be acquired in the loaded state, demagnetizing field correction can be performed with high accuracy. It is thus possible to accurately estimate the deterioration state of the magnetic properties of magnetic material included in a motor device. Note that, in the second embodiment, for acquiring magnetic properties in the loaded state returning from the third quadrant to the first quadrant via the fourth quadrant, the value H=H2 just needs to be set as the sweep end value He.

Third Embodiment

A vibrating sample magnetometer according to a third embodiment will be described with reference to FIGS. 10 and 11. FIG. 10 is a process chart showing an example of a measurement procedure of the vibrating sample magnetometer according to the third embodiment. FIG. 11 is a diagram illustrating magnetic properties (B-H loop) obtained under the second measurement condition (P1,T0) in a loaded state in the third embodiment. In the third embodiment, the magnetic properties of the measurement sample S being subjected to a load are acquired by use of a method of first order reversal curve (FORC) analysis. In FORC measurement, when a magnetization curve is measured by the sweeping of a magnetic field in a negative direction from a positive saturation state, a magnetic field sweep direction is reversed at a magnetic field value Hr during demagnetization, and the magnetic field H is swept again toward positive saturation. As this process is sequentially performed while the magnetic field value Hr is gradually changed, the inside of a hysteresis curve is filled with FORCs. The FORC analysis visualizes information about a magnetization process inside the bulk of a measurement sample.

First, as described with reference to FIG. 5, the control device 10 sets the measurement condition of the measurement sample S in the initial state to the first measurement condition (P0,T0) described above that is in the unloaded state. The pressure P0=0 MPa, and the temperature T0=25° C. In addition, the control device 10 performs full-loop magnetic-field sweep control of controlling the excitation electromagnet 5a to apply the external magnetic field H to the measurement sample S. That is, the external magnetic field is swept from zero (H=0) to the positive-side limit value "Hlmt", swept from the positive-side limit value "Hlmt" to the negative-side limit value "−Hlmt", and swept from the negative-side limit value "−Hlmt" to the positive-side limit value "Hlmt". According to the magnetic-field sweep control under the first measurement condition (P0, T0), a full-loop B-H loop can be acquired as illustrated in FIG. 5 (step S300).

Next, the control device 10 applies the external magnetic field H to the measurement sample S such that the external magnetic field H changes from zero (H=0) to the positive-side limit value "Hlmt" of the measuring instrument, while keeping the measurement condition of the measurement sample S to the first measurement condition (P0,T0) that is in the unloaded state.

Next, the control device 10 reduces the external magnetic field H to the magnetic field value H2, as in the second embodiment, where H2<Hmax. Furthermore, the control device 10 sets the measurement condition of the measurement sample S to the second measurement condition (P1,T0) that is in the loaded state. For example, the pressure P1=100 MPa, and the temperature T0=25° C. After the temperature and pressure of the measurement sample S are stabilized, the control device 10 sweeps the magnetic field in the negative direction from the magnetic field value H2 to the magnetic field value Hr in the loaded state. Furthermore, the control device 10 reverses the magnetic field sweep direction at the magnetic field value Hr, and sweeps the magnetic field in a positive direction from the magnetic field value Hr to the magnetic field value H2 (step S310). As a result, a magnetization curve is acquired as indicated by a line J1 in FIG. 11. Moreover, the control device 10 repeatedly performs this process while gradually changing the magnetic field value Hr. As a result, the inside of a hysteresis curve is filled with FORCs, as illustrated in FIG. 11 (steps S320 and S330).

Next, the control device 10 calculates a difference ΔB4 between the magnetic properties under the first measurement condition (P0,T0) and the magnetic properties under the second measurement condition (P1,T0) (step S340). The demagnetization properties of the measurement sample S to which stress is being applied can be grasped based on the difference ΔB4.

As described above, in the third embodiment, a value smaller than the maximum magnetization force Hmax in the unloaded state is set as the magnetic field value H2 which is the sweep start value Hs, and magnetic-field sweep control is performed in the loaded state by use of the FORC analysis method. Therefore, it is possible to more accurately measure the deterioration state of magnetic properties of the measurement sample S to which an external load is applied. In addition, since magnetic properties in the first quadrant can also be acquired in the loaded state, demagnetizing field correction can be performed with high accuracy. It is thus possible to accurately estimate the deterioration state of the magnetic properties of magnetic material included in a motor device. Note that, in the third embodiment, the first magnetic field value Ha obtained in the first embodiment may be set as the sweep start value Hs.

Fourth Embodiment

In a fourth embodiment, when magnetic properties are acquired in a loaded state, the temperature T of the measurement sample S is set to a temperature T1. The temperature T1 is different from the temperature T (=T0) of the measurement sample S used when magnetic properties are acquired with no load. This makes it possible to grasp irreversible demagnetization due to a temperature change in addition to a pressure change.

Specifically, the second measurement condition in the loaded state is set to, for example, (P1,T1) in step S110 of the process chart of FIG. 4. For example, the pressure P1=100 MPa, and the temperature T1=150° C. Other measurement conditions such as the external magnetic field H are the same as those described in step S110. Furthermore, when the magnetic properties of the measurement sample S in the loaded state are acquired in step S160 of FIG. 4, the temperature T of the measurement sample S may also be set to a temperature different from the temperature T of the measurement sample S used when magnetic properties are acquired with no load. Similarly, when magnetic properties are acquired in the loaded state (step S210 in FIG. 8 and step S310 in FIG. 10) in the second embodiment and the third embodiment, the temperature T of the measurement sample S may also be set to a temperature different from the temperature T of the measurement sample S used when magnetic properties are acquired with no load.

As described above, according to the fourth embodiment, it is possible to accurately measure the deterioration state of magnetic properties of the measurement sample S being subjected to an external load and a temperature change.

The configurations set forth in the above embodiments show examples of the subject matter of the present disclosure, and it is possible to combine the configurations with another known technique, and is also possible to partially omit or change the configurations without departing from the scope of the present disclosure.

REFERENCE SIGNS LIST 1 sample housing vibrating body; 1a sample storage portion; 1b pressure application rod; 1c temperature detection unit; 2 support platform; 3 vibrating device; 4 external force application mechanism; 4a pressure detection unit; 5 magnetic property imparting and measuring unit; 5a excitation electromagnet; 5b detection coil; 7 temperature control gas supply pipe; 8 temperature control gas supply device; 10 control device; 11 main control unit; 12 magnetic property acquisition unit; 13 temperature acquisition unit; 14 pressure acquisition unit; 15 vibration control unit; 16 temperature control unit; 17 pressure control unit; 18 external load environment determination unit; 19 external magnetic field sweep unit; 100 vibrating sample magnetometer; 101 processor; 102 memory; 103 interface circuit.

The invention claimed is:

1. A vibrating sample magnetometer comprising:
a sample housing vibrating body to house a measurement sample and vibrate the measurement sample in a single direction;
an excitation electromagnet to apply an external magnetic field H to the measurement sample;
a pressure application device to apply pressure to the measurement sample;
a pressure detector to measure the applied pressure;
a processor; and
a memory to store a program which, when executed by the processor, performs operations of:
detecting an induced voltage caused by vibration of the measurement sample magnetized by the excitation electromagnet to acquire a magnetic property, the magnetic property indicating a relationship between a magnetic flux density B and the external magnetic field H, the magnetic flux density being a sum of magnetization of the measurement sample and the external magnetic field H; and
controlling the external magnetic field H and the pressure, and sweeping the external magnetic field H, wherein
the processor acquires the magnetic property under a first measurement condition in an unloaded state, and
after applying the external magnetic field H to the measurement sample such that the external magnetic field H changes from zero (H=0) to a positive-side limit value Hlmt of the magnetic property acquisition unit while keeping a measurement condition of the measurement sample to the first measurement condition that is in the unloaded state, the processor sets the measurement condition of the measurement sample to a second measurement condition that is in a loaded state, sets, as a sweep start value Hs, a first magnetic field value that is a value of the external magnetic field H sufficiently weak to avoid restoring the magnetic property, sets a sweep end value He of the external magnetic field H to a negative-side limit value −Hlmt of the magnetic property acquisition unit, and acquires a demagnetization property that is the magnetic property, the processor further calculates a difference ΔB1 between the magnetic property under the first measurement condition and the magnetic property under the second measurement condition, and determines, from the difference ΔB1, the demagnetization property of the measurement sample to which pressure is applied, and the processor further acquires, after the acquiring under the second measurement condition, a magnetic property of the measurement sample under a third measurement condition where the measurement sample is unloaded after being subjected to a load, the third measurement condition including applying, via the excitation electromagnet of the vibrating sample magnetometer, a third external magnetic field to the measurement sample and vibrating the measurement sample, via the sample housing vibrating body, to induce the voltage, calculates a second difference between the magnetic property acquired under the first measurement condition and the magnetic property acquired under the third measurement condition and determines, via the processor, whether the second difference indicates an irreversible change in the magnetic property of the measurement sample due to being in the loaded state, and the first magnetic field value is smaller than a second magnetic field value that is a maximum magnetization force Hmax in the magnetic property obtained under the first measurement condition that is in the unloaded state.

2. The vibrating sample magnetometer according to claim 1, wherein after acquiring the magnetic property of the measurement sample under the second measurement condition that is in the loaded state, the processor unloads the applied pressure from the measurement sample, and acquires the magnetic property of the measurement sample from which the pressure is unloaded, and the processor specifies, as the sweep start value Hs for acquiring the magnetic property under a loaded condition, a first magnetic field value equal to or less than a second magnetic field value, the second magnetic field value-corresponding to a saturation magnetic flux density in the magnetic property of the measurement sample from which the pressure is unloaded.

3. The vibrating sample magnetometer according to claim 2, wherein the processor sweeps the external magnetic field H for the measurement sample by using the specified sweep start value Hs, and acquires the magnetic property of the measurement sample in the loaded state.

4. The vibrating sample magnetometer according to claim 1, wherein the first magnetic field value is set to a value that is X percent smaller than the second magnetic field value, and the value X varies depending on resistance to demagnetization caused by application of the pressure to the measurement sample.

5. The vibrating sample magnetometer according to claim 1, wherein the processor controls a temperature of the measurement sample, wherein the processor sets the temperature of the measurement sample such that the temperature of the measurement sample differs between a case where the processor acquires the magnetic property of the measurement sample in the loaded state and a case where the processor acquires the magnetic property of the measurement sample in the unloaded state.

6. The vibrating sample magnetometer according to claim 2, further comprising:

a temperature control unit to control a temperature of the measurement sample, wherein the processor sets the temperature of the measurement sample such that the temperature of the measurement sample differs between a case where the processor acquires the magnetic property of the measurement sample in the loaded state and a case where the processor acquires the magnetic property of the measurement sample in the unloaded state.

7. The vibrating sample magnetometer according to claim 3, further comprising:

a temperature control unit to control a temperature of the measurement sample, wherein the processor sets the temperature of the measurement sample such that the temperature of the measurement sample differs between a case where the processor acquires the magnetic property of the measurement sample in the loaded state and a case where the processor acquires the magnetic property of the measurement sample in the unloaded state.

8. The vibrating sample magnetometer according to claim 4, further comprising:

a temperature control unit to control a temperature of the measurement sample, wherein the processor sets the temperature of the measurement sample such that the temperature of the measurement sample differs between a case where the processor acquires the magnetic property of the measurement sample in the loaded state and a case where the processor acquires the magnetic property of the measurement sample in the unloaded state.

9. A measurement method of magnetic property deterioration using a vibrating sample using a vibrating sample magnetometer, the method including:

housing the measurement sample in a sample housing vibrating body of the vibrating sample magnetometer that vibrates in a single direction;

acquiring a magnetic property of the measurement sample under a first measurement condition that is in an unloaded state by applying, via an excitation electromagnet of the vibrating sample magnetometer, a first external magnetic field to the measurement sample and vibrating the measurement sample, via the sample housing vibrating body, to induce a voltage;

acquiring a magnetic property of the measurement sample under a second measurement condition that is in a loaded state by applying, via the excitation electromagnet of the vibrating sample magnetometer, a second external magnetic field to the measurement sample and vibrating the measurement sample, via the sample housing vibrating body, to induce the voltage, the magnetic property of the measurement sample under a second measurement condition being a demagnetization property;

calculating a first difference between the magnetic property under the first measurement condition and the magnetic property under the second measurement condition;

acquiring, after the acquiring under the second measurement condition, a magnetic property of the measurement sample under a third measurement condition where the measurement sample is unloaded after being subjected to a load, the third measurement condition including applying, via the excitation electromagnet of the vibrating sample magnetometer, a third external magnetic field to the measurement sample and vibrating the measurement sample, via the sample housing vibrating body, to induce the voltage;

calculating a second difference between the magnetic property acquired under the first measurement condition and the magnetic property acquired under the third measurement condition; and determining, via the processor, whether the second difference indicates an irreversible change in the magnetic property of the measurement sample due to being in the loaded state.

10. The measurement method of magnetic property according to claim 9, wherein a load applied in the loaded state is a pressure.

11. The measurement method of magnetic property according to claim 9, wherein the step of acquiring the magnetic property of the measurement sample under the first measurement condition includes:

controlling a temperature gas supply of the vibrating sample magnetometer such that the temperature of the measurement sample becomes T0;

controlling an external force applicator of the vibrating sample magnetometer such that pressure applied to the measurement sample becomes a pressure P0; and performing full-loop magnetic-field sweep control of controlling excitation electromagnet to apply the external magnetic field to the measurement sample.

12. The measurement method of magnetic property according to claim 11, wherein the step of performing full-loop magnetic-field sweep control of controlling excitation electromagnet to apply the external magnetic field to the measurement sample under the first measurement condition includes:

applying the external magnetic field in an initial state of zero external magnetic field to a point having a saturation magnetic flux density; then decreasing the external magnetic field to back to zero external magnetic field; then applying the external magnetic field in a reverse direction to a negative saturation magnetic flux density.

13. The measurement method of magnetic property according to claim 12, wherein the step of performing full-loop magnetic-field sweep control of controlling excitation electromagnet to apply the external magnetic field to the measurement sample under the first measurement condition further includes:

after applying the external magnetic field in the reverse direction, applying the external magnetic field to increase the external magnetic field to the measurement sample back to the saturation magnetic flux density.

14. The measurement method of magnetic property according to claim 11, wherein the step of acquiring the magnetic property of the measurement sample under the second measurement condition includes:

controlling the external force applicator such that pressure applied to the measurement sample becomes a pressure P1, P1 being greater than P0; and performing a magnetic-field sweep control of controlling excitation electromagnet to apply the external magnetic field to the measurement sample.

15. The measurement method of magnetic property according to claim 14, wherein the step of performing the magnetic-field sweep control of controlling excitation electromagnet to apply the external magnetic field to the measurement sample under the second measurement condition includes:

applying the external magnetic field in an initial state of zero external magnetic field to a positive external magnetic field; and applying the external magnetic field in a reverse direction.

* * * * *